US006358576B1

(12) United States Patent
Adur et al.

(10) Patent No.: US 6,358,576 B1
(45) Date of Patent: Mar. 19, 2002

(54) CLAY-FILLED POLYMER BARRIER MATERIALS FOR FOOD PACKAGING APPLICATIONS

(75) Inventors: Ashok M. Adur, Ramsey, NJ (US); Raymond A. Volpe, Wethersfield, CT (US); Keith S. Shih, Harriman, NY (US)

(73) Assignee: International Paper Company, Purchase, NY (US)

( * ) Notice: Subject to any disclaimer, the term of this patent is extended or adjusted under 35 U.S.C. 154(b) by 0 days.

(21) Appl. No.: 09/022,825

(22) Filed: Feb. 12, 1998

(51) Int. Cl.$^7$ .................................................. B32B 27/10
(52) U.S. Cl. .................... 428/34.2; 428/34.3; 428/35.9; 428/36.6; 428/36.7; 428/511; 428/513; 428/537.5; 428/702; 229/5.81; 229/5.84; 229/406
(58) Field of Search .............................. 428/34.2, 537.5, 428/702, 36.6, 36.7, 34.3, 35.9, 511, 513; 156/244.11, 229; 229/406, 5.81, 5.84

(56) References Cited

U.S. PATENT DOCUMENTS

| | | | | |
|---|---|---|---|---|
| 4,911,960 A | * | 3/1990 | Mudge et al. | 428/34.3 |
| 4,933,526 A | * | 6/1990 | Fisher et al. | 426/107 |
| 5,079,083 A | * | 1/1992 | Watkins et al. | 428/323 |
| 5,153,061 A | * | 10/1992 | Cavagna et al. | 428/325 |
| 5,817,384 A | * | 10/1998 | Furuta et al. | 428/34.2 |
| 5,876,815 A | * | 3/1999 | Sandstrom et al. | 428/34.2 |

* cited by examiner

*Primary Examiner*—Rena L. Dye
(74) *Attorney, Agent, or Firm*—Luedeka, Neely & Graham, P.C.

(57) ABSTRACT

The specification discloses a layered composite containing a barrier layer comprising clay homogeneously dispersed in a continuous phase of polymeric material. The barrier layer is especially useful in the manufacture of liquid food containers. The clay/polymer barrier layer is formed by dispersing the clay in molten polymeric material to form a homogeneously dispersed clay in a continuous polymer phase. The barrier layer is then applied adjacent one surface of a paperboard component of the composite at a thickness ranging from about 1 to 30 microns. The paperboard may be coated or uncoated at the time the barrier layer is applied, and additional polymeric barrier layers and tie or adhesive layers may be used in combination with the barrier layer to provide reduced oxygen and water vapor transport through the composite. The method of preparing and applying the barrier layer to a paperboard substrate also significantly reduces process steps required to provide coated paperboard with improved barrier properties.

36 Claims, No Drawings

CLAY-FILLED POLYMER BARRIER MATERIALS FOR FOOD PACKAGING APPLICATIONS

FIELD OF THE INVENTION

The present invention relates to improved barrier coatings, to methods for coating substrates used in manufacturing food containers and to food containers having coatings which limit certain adverse affects of oxygen and/or moisture on the contents.

BACKGROUND

Various coatings have been applied to paperboard substrates to provide composite materials that may be used for various purposes. In particular, barrier coatings have been applied to paperboard substrates used to make food containers in order to reduce the transport of moisture and oxygen into the food that may spoil or contaminate the food or otherwise disaffect its flavor or shelf life.

Accordingly, for food container applications, paper and paperboard substrates are conventionally coated with barrier coatings selected from various polymers such as polyethylene which provides a moisture barrier and ethylene-vinyl alcohol copolymer (EVOH) to address flavor or property-affecting atmospheric changes in the containers. Such coatings can reduce transmission of moisture and oxygen through the packaging material and provide for longer shelf life for the food packaged in the container. However, some oxygen sensitive foods, such as orange juice, tomato products and fresh meat still have only a relatively short life of a few weeks despite the barrier coatings. The short shelf-life is due, at least in part, to oxidation caused by the oxygen left in the headspace during the package filling step and/or from leakage through the container or molecular diffusion through the barrier coatings on the container.

Methods have been devised for reducing the oxygen transported through food containers in an effort to increase the shelf life of the contents. One such method is the use of clay which has been recognized as an effective material to reduce oxygen and/or moisture transport through a packaging container. Conventionally, the clay in an aqueous solution or aqueous suspension is applied to the container using a water soluble hydrophilic binder or an aqueous latex binder. After applying the clay coating, an aqueous adhesive coating may be applied to the clay-coating and a barrier layer may be applied to the adhesive coating layer. The resulting clay coating is comprised of essentially two discontinuous phases, one phase containing clay and one phase containing the polymeric binder. The other polymeric layers applied over the clay coating are likewise discrete phases of material.

A description of a conventional clay coating process is found in U.S. Pat. No. 5,153,061 to Cavagna et al. which describes a barrier coating that may be applied to the inner or outer surface of a paperboard substrate in order to absorb a contaminate emitted by the substrate or provide a tortuous path so that the migration of the contaminate through the barrier layer is reduced. The material used for absorbing contaminants is activated carbon and the ingredient for providing a tortuous path is a delaminated clay pigment. In order to provide a tortuous path layer, the pigment and activated carbon are dispersed in a water soluble binder such as polyvinyl alcohol and applied to the substrate, and a polyethylene terephthalate layer is then coated over the tortuous path layer. While the coatings of Cavagna et al. are said to be effective in reducing the transport of undesirable substances into the food, the process for applying multiple coatings raises the expense of production and complicates the manufacturing process.

Another disadvantage of multiple coating steps is that the clay-coated substrate must be heated to remove water therefrom prior to applying additional layers to the clay coating. Such heating is expensive and reduces the product throughput rate.

Accordingly, it is an object of the invention to provide a relatively low cost composition for producing food containers.

Another object of the invention is to provide a polymer composition for coating paper and paperboard substrates which exhibits improved oxygen and/or water vapor barrier properties.

Another object of the invention is to reduce the manufacturing costs of food container products having improved oxygen and water vapor barriers properties.

Still another object of the invention is to provide an improved barrier layer for a paperboard food container which can be applied to a paperboard product by mono or co-extrusion coating or lamination.

Another object of the invention is to provide an improved polymeric material for use as a food container which can be blown, cast or extruded into a container shape.

Yet another object of the invention is to provide a method for applying an oxygen and water vapor barrier to a paperboard product for use as a food container.

Another object of the invention is to provide a method for applying a clay/polymer composition to a paperboard product for use in making food containers.

SUMMARY OF THE INVENTION

With regard to the above and other objects, the present invention provides a layered composite comprising a paper or paperboard substrate having opposed surfaces and a barrier layer applied adjacent at least one of the surfaces of the substrate, the barrier layer comprising a composition containing from about 1 to about 80% by weight clay homogeneously dispersed in from about 20 to about 99% by weight of a continuous phase comprising a thermoplastic material selected from the group consisting of polyamides, thermoplastic polyesters, polyolefins, nitrile polymers, thermoplastic polyurethanes and copolymers of ethylene and vinyl alcohol and, optionally, a coupling agent, compatibilizer or dispersion aid. In order to provide a continuous polymeric phase containing clay, it is preferred that the polymeric material be substantially water insoluble. By "substantially water insoluble" means a solubility of the polymer of less than 1 milligram per liter of distilled water having a pH of 6.5 to 7.5 at a temperature of 25° C. according to ASTM test method E 1148.

In another aspect, the invention provides a method for making a multi-layer composite containing at least one paperboard layer having opposed first and second surfaces which comprises dispersing from about 1 to about 80% by weight, preferably from about 10 to about 60% by weight and most preferably from about 30 to about 50% by weight particulate clay in from about 20 to about 99% by weight thermoplastic polymer selected from the group consisting of polyamides, thermoplastic polyesters, polyolefins, nitrile polymers, polyurethanes and copolymers of ethylene and vinyl alcohol and, optionally, a coupling agent, dispersion aid and/or compatibilizer under conditions sufficient to provide an essentially dry, continuous polymer phase with clay homogeneously dispersed therein without significantly degrading the polymer. The polymer phase containing clay is then extruded as a layer adjacent the first surface of the paperboard layer at rate of from about 500 to about 2000 linear feet per minute to obtain a coating weight of from about 2 to about 60 pounds per 3000 square feet of substrate and thereby provide a clay/polymer barrier layer having a thickness ranging from about 1 to about 100 microns, preferably from about 2 to about 50 microns, and most preferably from about 3 to about 8 microns adjacent said first surface of said paperboard layer.

An advantage of the invention is that barrier layers composed of the clay/polymer composition exhibit significantly lower water vapor transport and oxygen transmission properties than the same polymeric material without the clay. Furthermore, the layer may be applied to the paperboard substrate in a single processing step rather than in multiple coating steps and without the need to dry the clay/polymer layer applied to the substrate.

The clay/polymer composition has the added advantage of providing relatively greater stiffness to a polymeric structure made from the composition or to a paperboard container coated with the composition as compared to the same structure or container without the clay filled polymeric material. When applied as a barrier layer coating to a food container, the clay-filled barrier layer reduces the transmission of oxygen and/or water vapor through the coated composite thereby improving the shelf-life of the food in the container.

The invention provides an improved barrier layer compositions which are especially well-suited for use in making liquid food containers. The food containers include a clay/polymer composition which may be extrusion coated onto a substrate or formed into a sheet or shaped article by well know forming techniques. Because the composition contains clay, the composition provides a significant reduction in the transmission of oxygen and water vapor into a container made with the composition. When used in conjunction with food containers for oxygen sensitive foods, the compositions of the invention provide an improved shelf-life for the foods in the containers.

Barrier layers according to the invention are typically applied adjacent or onto the side of the container substrate to be adjacent the food. Accordingly, the barrier layers may be the layer of a container made from multi-layer composite which comes in direct contact with food or other layers of material may be coated on the barrier layer so that the barrier layer does not come in direct contact with the food. The outside of the container may also be coated with the barrier layer containing the composition of the invention, however, typically only the inside or food side of the container contains such layer.

The substantially continuous polymeric phase having clay homogeneously dispersed therein may be extrusion coated onto a substrate or formed or molded into a stand alone film or shaped article. It is preferred that the clay and polymeric material be dried and maintained essentially dry during the compounding and extrusion processes. As used herein, the term "essentially dry" or "substantially dry" means that the moisture content is about 0.01% by weight or lower. Because a conventional compounding extruder contains a moisture vent which allows moisture to escape from the composition during compounding, it may not be necessary to maintain essentially dry conditions during the initial compounding step assuming the materials are heated sufficiently to drive off moisture. However, producing a drier composition of clay and polymeric material increases the processability of the composition in the extrusion step.

The clay which may be used in the barrier layer according to the invention may be selected from any of the commercially available clays or pigments. Suitable clays include, but are not limited to, kaolinite, montmorillonite, halloysite, attapulgite, bentonite and illite. A preferred clay is a type 80 non-calcined kaolin clay available from Southeastern Clay Company of Aiken, S.C. Another non-calcined kaolin clay which may be used is available from Englehard Corporation at Iselin, New Jersey under the tradename BUCA clay. It is especially preferred to use a calcined kaolin clay such as the clay sold by Englehard Corporation under the trade names SATINTONE 5HB or SATINTONE 5.

In addition to the foregoing calcined and non-calcined clays any of the before mentioned clays may also be surface treated clays. Clays may be surface treated with an organo silane such as a gamma-aminopropyltriethoxysilane under the tradename SILQUEST A-1100 or vinyl triethoxy silane under the tradename SILQUEST A-151 available from OSI Specialites, Inc. of Danbury, Conn., an organoreactive silane under the tradename Z-6032 or an arylalkoxy silane under the tradename Z-6124 available from Dow Corning of Midland, Mich. An example of a surface treated clay is a calcined kaolin clay available from Englehard Corporation under the tradename TRANSLINK 555.

Suitable clays have an average particle size ranging from about 0.02 to about 0.2 times the thickness of the polymeric material used as a coating or film and preferably have a plate-like structure. Accordingly, for a polymeric layer having a thickness of from about 2 to about 10 microns, the average particle size of the clay may range from about 0.04 to about 2 microns. Preferably, the clay has an average particle size ranging from about 0.2 to about 1.5 microns, and most preferably the clay has an average particle size ranging from about 0.3 to about 1.0 microns.

The other major component of the clay/polymer composition is a substantially water insoluble thermoplastic material selected from the group consisting of polyolefins such as polyethylene and polypropylene, polyamides, polyurethanes, thermoplastic polyesters, nitrile polymers and ethylene/vinyl alcohol copolymers (EVOH). As used herein, "EVOH" means ethylene/vinyl alcohol copolymers.

A preferred substantially water insoluble thermoplastic material is EVOH such as the copolymers sold under the trade names SOARNOL A2908, SOARNOL A2920, SOARNOL A4412, SOARNOL K3825 and the like which are commercially available from Nippon Gohsei of Osaka, Japan, and EVAL E-105 and EVAL G110 and the like which are commercially available from Kurraray Co. Ltd. of Osaka, Japan or its North American subsidiary EVALCA of Laporte, Tex. Such EVOH materials are copolymers of vinyl alcohol and ethylene having a melt flow index (MFI) in the range of from about 1 to about 50 at 210° C. and 2.16 kilograms according to ASTM D 1238, preferably from about 5 to about 35 MFI and most preferably from about 8 to about 25 MFI, a melting point in the range of from about 150° to about 195° C. and a formula as follows:

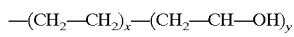

where x is the number of repeat units of the ethylene unit in the copolymer and y is the number of repeat units of the vinyl alcohol unit in the copolymer. The mole percent of ethylene units in the copolymer is defined as $100x/(x+y)$. Typically, the EVOH copolymer used in packaging applications has an ethylene content (mole %) in the range of from about 25 to about 55%.

If the polymeric material is exposed to moist air before compounding with the clay, it is preferred to dry the polymeric material prior to compounding the material with the clay so that its moisture content is less than about 0.5% by weight, preferably less than about 0.2%. Typically, the EVOH copolymer is shipped in a closed container as solid pellets having a moisture content below about 250 ppm, thus it is usually not necessary to pre-dry the polymeric pellets.

If the polymer pellets have a higher moisture content than about 0.2% by weight and the compounding extruder is not equipped with a vent, the polymeric pellets may be fed to a hopper drier attached to an extruder for drying the pellets to the desired moisture content. Other methods may be used to dry the polymeric material prior to compounding with clay in such a compounder or extruder.

If the clay is to be dried prior to compounding, suitable drying techniques for the clay may include the use of heat, desiccants, acetone wash, dry gas purge and other methods known to those of ordinary skill. It is particularly preferred to pre-dry the clay for about 8 to 12 hours or more at a temperature ranging from about 150° to about 180° C. before mixing the clay with the polymeric material so that the clay has a moisture content of less than about 0.5 percent by weight, preferably less than about 0.2% by weight. Once dried, the clay is preferably maintained under a dry gas atmosphere and the dried clay is fed to an extruder while maintaining the dry gas atmosphere for the clay and the extruder. In the alternative, the clay may be dried by feeding the clay to a hopper drier attached to the extruder.

The clay may be mixed with from about 20 to about 99.9% by weight polymeric material to provide a non-aqueous composition containing from about 0.1 to about 80% by weight clay. Preferably, the composition contains from about 10 to about 60% by weight clay, and most preferably from about 30 to about 60% by weight clay. It is important to note that the clay is compounded with the polymeric material, according to the invention, without forming an organo-clay compound and without using solvents for the clay or polymeric material.

Typically, but not necessarily, clay is compounded with the polymer in a separate compounding step. Accordingly, extrusion compounders may be used to prepare such compositions. The extrusion compounder may be a twin screw extruder, a kneading extruder or a single screw extruder having a screw configuration which provides dispersive and distributive mixing sufficient to provide a substantially homogeneous molten composition of clay and polymer without significantly degrading the polymer due to high localized shear, high temperatures or long residence times. If the apparatus does not contain a vent, then it is preferred to dry the clay and polymeric material so that both materials are essentially dry and then feed the materials under conditions sufficient to maintain the components so that they remain essentially dry. Examples of suppliers of suitable equipment for making the compositions include, but are not limited to, Brabender, Haake, Buss, Egan, Davis-Standard, Werner-Pfleiderer, Welding Engineers, American Leitritz, Toshiba, Japan Steel Works, Farrel and Banbury.

Significant degradation of the polymeric material is evident by the porosity of a film or coating comprised of the clay/polymer composition. Degradation of the polymer results in higher porosity or higher transport of oxygen and/or water vapor through a film or coating made from the clay/polymer composition due at least in part to the poor dispersion of the clay in the degraded polymer matrix. Accordingly, excessive compounding or shearing of the polymer during the compounding and extruding steps should be avoided.

In order to sufficiently disperse the clay in the polymeric material during compounding in an extruder, other materials such as dispersion aids, coupling agents or compatibilizers may be added to the formulation. It is preferred to mix the clay with a dispersion aid or compatibilizer in an amount of from about 1 wt. % to about 15 wt. % of total weight of the mixture. Once compounded, the composition containing clay, dispersion aid and polymeric material is extruded and/or coated onto a surface of the substrate or onto a subcoating or tie layer on the substrate thereby providing a clay/polymer barrier layer adjacent the surface of the substrate.

Compatibilizers, coupling agents or dispersion aids which may be used include, but are not limited to, carboxylic acids and their derivatives, such as metal acid salts, acid anhydrides, acid chlorides, and the like such as stearic acid, calcium stearate, succinic acid and maleic anhydride; copolymers of ethylene with vinyl, acrylic or other aliphatic, aromatic and aliphatic organic esters such as ethylene-acrylic acid copolymers, ethylene-methacrylic acid copolymers, and ethylene-maleic anhydride copolymers including the commercially available copolymers from Allied-Signal of Morristown, New Jersey under the tradename ACLYN 295A, from Dow Chemical Company of Midland, Mich. under the tradename PRIMACOR 5980 and from DuPont de Nemours & Company of Wilmington, Del. under the tradename NUCREL 499; various polyolefinic compounds such as polyethylene and polypropylene grafted with acid or anhydride or other acid derivative functional group, such as the compounds available from Allied-Signal under the trade names ACTONE 2573P and ACX 575, POLYBOND 1009 and POLYBOND 3009 from Uniroyal Chemical Company of Williamstown, N.J. and EPOLENE E-43P available from Eastman Chemical Company of Kingsport, Tenn.

The clay, polymeric material and optional coupling agent, dispersion aid or compatibilizer may be compounded in a variety of ways. For example, clay in the form of dry powder may be dry-mixed with a dispersion aid in powder form and fed into the second feed entrance port of a compounding extruder. Alternatively, the clay and/or dispersion aid mixture in pellet form may be introduced in the main feed port of an extruder along with pellets of the polymeric material.

As with the other components of the composition, the compatibilizer, coupling agent or dispersion aid should also be substantially dry before compounding with the clay and polymer if the compounder does not contain a vent. Moisture contents of these components should be below about 0.2 wt. %, preferably below about 0.1 wt. % for effective compounding with the clay and polymer.

In order to provide consistency from batch to batch in production runs, it is important to maintain a precise weight ratio among the polymer pellets, dispersion aid and clay during the compounding process. Conventional loss-in-weight feeders may be used to control the ratio of components fed to the compounder.

When compounding clay into EVOH, the extruder is preferably operated with barrel temperatures ranging from about 150° C. to about 250° C., most preferably from about 170° C. to about 210° C. and at a pressure ranging from about 50 to about 2,000 pounds per square inch (psig).

Extruders with single or multiple screws may be used as long as they provide sufficient dispersive and distributive mixing. The screw speed may range from about 25 to about 1500 rpm at a feed rate ranging from about 20 to about 500 pounds per hour (lb./hr). In larger production-size compounding units, the rates may be as high as 50,000 lb./hr or even higher.

After compounding the clay and polymeric material to form a clay/polymer composition, the composition may be cooled in a water bath or by a water-ring pelletizer to provide solid pellets which may be stored and fed to an extruder in a separate extrusion process. If the composition is cooled and solidified using water, it is preferred to dry the solidified composition for from about 4 to about 12 hours at a temperature in the range of from about 100° to about 140° C. before feeding the composition to an extruder. If the composition is fed directly into an extruder/coater, there is no need to cool the composition with water and thus drying of the composition is not required, provided the compounding is conducted under essentially dry conditions or the compounder contains a vent.

After compounding and melting the composition, the substantially homogeneous composition of clay and polymeric material is ready for application to the surface of a substrate in a relatively thin, continuous layer, or on a subcoating already on or coextruded directly on the substrate surface. The clay/polymer composition layer is preferably applied to a substrate in an amount sufficient to provide a coating weight of from about 0.5 to about 50 pounds per 3000 square feet of paperboard, preferably from about 1 to about 35 pounds per 3000 square feet, and most preferably from about 2 to about 9 pounds per 3000 square feet. Coating weights within the foregoing range provide a layer having a thickness ranging from about 1 to about 30 microns, preferably from about 3 to about 8 microns.

While the present invention is especially well-suited for multi-layer composites containing paperboard substrates, the invention is not limited to such substrates. Accordingly, the substrate may be comprised of paper, paperboard, polymer film, aluminum foil, or a combination or composite of the foregoing materials.

Examples of paperboard substrates include, but are not limited to, bleached or unbleached paperboard, kraft, sulfide, or multi-ply paperboard and the like. The paper or paperboard weight may range from about 3 lb./3000 square feet to about 500 lb./3000 square feet. A particularly preferred substrate for the composition containing clay and substantially water insoluble thermoplastic material is bleached paperboard made by International Paper Company of Purchase, New York with weights in the range of from about 150 lb. to about 400 lb./3000 square feet and more preferably in the range of from about 180 to about 300 lb./3000 square feet. Another preferred substrate is a bleached paper or unbleached kraft paper with weights in the range of from about 10 to about 200 lb./3000 square feet and more preferably in the range of from about 20 to about 60 lb./3000 square feet.

Various other coatings or treatments may be applied to the paperboard before or after coating the paperboard with the clay/polymer composition. Such other coatings include sizing agents, primers and other wet-end and off-line additives.

Methods known to those of ordinary skill may be used to produce a container containing a clay/polymer composition as the sole structural material for the container or the composition may be applied in one or more coatings or layers on a cellulosic or polymeric substrate. Containers other than coated paperboard containers may comprise a single or multi-layer rigid or flexible polymeric structure or plastic article containing a substantially homogeneous composition containing clay and polymeric material according to the invention. Examples of such a rigid or flexible containers include plastic bottles, jars, pouches, bags and the like.

While it is believed necessary to have the clay/polymeric material barrier layer adjacent only one surface of the paperboard substrate, both surfaces may have the barrier layer applied adjacent thereto. In addition, other polymeric layers may be used in conjunction with the barrier layer containing clay. For example, and not by way of limitation, when the polymeric material used for the barrier layer is EVOH, it is preferred to also use a polyolefin layer, preferably polyethylene (PE). When an additional PE layer is used, an adhesive layer or tie layer having a thickness of from about 2 to about 5 microns is preferably used to adhere the PE layer to the clay/polymer barrier layer. In the alternative, the PE layer may contain an amphiphilic resin as described in U.S. Pat. No. 5,464,691 to Gardiner et al., incorporated by reference as if fully set forth, rather than using a tie layer between the PE and clay-filled layer, to increase the bonding strength between the clay-filled EVOH and the PE layer. The PE layer used in conjunction with the clay/polymer barrier layer generally has a thickness ranging from about 15 to about 30 microns and provides a food contact surface for the container.

Exemplary multi-layer composite structures using the clay/polymer barrier layer according to the invention are as follows LDPE/Paperboard/Nylon/Tie-layer/LDPE/Tie-layer/clay-EVOH layer, LDPE/Paperboard/Nylon/Tie-layer/ LDPE/Tie-layer/clay-EVOH layer/Tie-layer/LDPE, LDPE/ Paperboard/LDPE/Tie-layer/EVOH/Tie-layer/clay-EVOH layer, LDPE/Paperboard/LDPE/Tie-layer/EVOH/Tie-layer/ LDPE/Tie-layer/clay-EVOH layer, LDPE/Paperboard/clay-Nylon layer/Tie-layer/LDPE/Tie-layer/EVOH/Tie-layer/ LDPE, LDPE/Paperboard/HDPE/Tie-layer/EVOH/Tie-layer/clay-EVOH layer, LDPE/Paperboard/PET/Tie-layer/ EVOH/Tie-layer/clay-EVOH layer, HDPE/Paperboard/ LDPE/Tie-layer/EVOH/Tie-layer/clay-EVOH layer, LDPE/ Paperboard/clay-Nylon layer/EVOH/Tie-layer/LDPE, LDPE/Paperboard/clay-Nylon layer/Tie-layer/LDPE/Tie-layer/EVOH/Tie-layer/LDPE, LDPE/Paperboard/Nylon/ Tie-layer/clay-LDPE layer/Tie-layer/EVOH, and LDPE/ HDPE/Paperboard/LDPE/Tie-layer/EVOH/Tie-layer/clay-EVOH layer, wherein the "clay-EVOH", "clay-Nylon", "clay-LDPE" comprise clay and the indicated thermoplastic material as well as any other additives such as antioxidants, dispersion aids, flow agents, lubricants, colorants, and any other additives typically used for making a composition or alloy formulation with a substantially water insoluble thermoplastic material and wherein EVOH indicates an ethylene/vinyl alcohol copolymer. The examples of structures listed above are not meant to limit the invention in any way and coated structures or films wherein the clay/polymer barrier layer is combined with one or more other layers or used alone are within the scope of this invention according to its various aspects.

Food containers made using the clay/polymer composition as a layer adjacent a paperboard substrate are not only characterized by a lower moisture and oxygen permeation through the barrier layer, but also have an increased stiffness as a result of the use of the clay/polymer composition. Stiffness in paperboard coated containers has been found to be increase about 6 to 10 percent thereby leading to less bulge in the filled paperboard container. Similarly, in plastic bottles, bags, films and other containers, stiffness has been found to improve 10 to 25%. As a result of the stiffness increase, it is possible to reduce the paperboard thickness required for such coated containers. For example, instead of a weight of about 295 pounds per 3000 square feet, the paperboard substrate may have a weight of about 260 pounds per 3000 square feet. Thus considerable savings may be achieved by coating a paperboard substrate with the clay/polymer barrier layer according to the invention.

The following nonlimiting examples further illustrate various aspects of the invention. In the examples, all percentages are expressed as % by weight of the total weight of the composition unless otherwise indicated.

EXAMPLE 1

Pigmented barrier film samples were extruded using a Leistriz 27 mm twin screw extruder available from American Leitritz Company of Somerville, N.J. A bentonite clay having an average particle size of 1–2 microns, a thickness of 0.001–0.002 microns and an aspect ratio of 1000 (dispersed) or 20–50 (dry) available from Sud Chemie of Louisville, Ky. under the trade name OPAZIL EX408EP was pre-dried at a temperature of 125° C. for 1–2 days. An EVOH copolymer having a melting point of about 164° C. and an ethylene content of 44 wt. % available from Nippon Gohsei of Japan under the trade name SOARNOL A4412 was compounded with the clay in the extruder in weight ratios of EVOH/clay of 80/20 and 70/30.

The weight ratio of EVOH to clay was calculated by using weight loss feeders. The clay was fed to the extruder using a Brabender weight loss feeder available from C. W. Brabender Instrument, Inc. of South Hackensack, N.J. A side stuffer was used to transfer the clay from the weight loss feeder into the extruder. The extrusion rate of the composition was calculated from the mass of composition extruded per unit time. The difference between the rate of extrusion and the clay feed rate was the consumption rate of EVOH resin.

The twin screw extruder was adjusted to a screw speed of 239 rpm and a melt temperature of 201° and a melt pressure of 400 psig. The extrusion line was equipped with a 6 inch wide sheet die with a gap setting of 0.015 inch. Free cast film sheets were generated by quenching the extrudate on a water-cooled quenching roll. The temperature set-points of each of zones of the extruder were as follows: zone 1—175° C., zone 2—180°, zone 3—185°, zone 4—185° C., zone 5—185°, zone 6—195°, zone 7—190°, zone 8—190° C.

The oxygen transmission rate (OTR) and other film properties for EVOH films and clay/EVOH films are shown in the following table. The OTR was measured at 24° C. and 75% relative humidity. The OTR is measured at 75% relative humidity at 24° C. according to ASTMD 3985.

TABLE 1

| Run No. | Composition (wt. %) | Film Thickness (mils) | OTR (mil-cc/100in$^2$-day) |
|---|---|---|---|
| 1 | EVOH (100) | 1.3 | 0.27 |
| 2 | EVOH (80) OPAZIL (20) | 3.9 | 0.19 |
| 3 | EVOH (70) OPAZIL (30) | 3.4 | 0.15 |

Of the foregoing runs, the EVOH films of Runs #2 and #3 exhibited significantly reduced OTR as compared to EVOH film (Run #1) which did not contain the clay pigment.

EXAMPLE 2

Clay/EVOH composition pellets were prepared using a variety of clay pigments. EVOH and clay were compounded and extruded into pellets by feeding the dry blends of EVOH and clay through a Brabender CTSE-V conical twin screw extruder equipped with a pair of counter rotating compounding-mixing screws. The dry blends of EVOH and clay were fed into the hopper of the extruder via a K-TRON Model K2M volumetric feeder commercially available from K-Tron Corporation of Pitman, N.J. The EVOH resin and clay pigments were previously dried in a BLUE M oven set at 105–115° C. oven temperature for 15–20 hours before use. In some examples, a dispersion aid was also used to make the EVOH/clay composition. When a dispersion aid was used, the ingredients were dry mixed in a 2-liter glass jar.

The hot melt coming out of the ¼ inch rod die of the extruder was passed through a water cooling trough into a KILLION pelletizer commercially available from Killion Extruder, Inc. of Cedar Grove, N.J.

Once compounded, the pellets exiting the extruder dried and then fed through a twin screw extruder to make thin films for testing. A six inch Flex-Lip ribbon die assembly was attached to the twin screw extruder for making the film. A Brabender UNIVEX film take-up device was used to cool and stretch the molten film to the final thickness. The temperature profile of the extruder zones were as follows: zone 1—190° C., zone 2—195°, zone 3—200°, zone 4(extruder die)—205° C. The screw speed was about 15 rpm. A combination of mesh 40/mesh 150/mesh 40 screen pack assembly was used to screen coarse or undispersed particles from the molten composition. The typical film thickness was 2 to 3 mils. The raw materials used for the runs were as follows:

EVOH is SOARNOL A4412,

Clay 1 is Southeastern Type 80 clay from Southeastern Clay Company of Aiken, S.C., Clay 2 is BUCA clay from Engelhard Corporation of Iselin, N.J., Clay 3 is SATINTONE 5HB clay from Engelhard Corporation, Clay 4, TRANSLINK 555 clay (calcined and surface treated) from Englehard Corporation, ACLYN 295A is ethylene acrylic acid copolymer neutralized with zinc from Allied Signal, Inc. of Morristown, N.J., AC-400A is ethylene vinyl acetate copolymer from Allied Signal, Inc., ACTONE 2573P is maleic anhydride grafted ethylene polymer from Allied Signal, Inc.

In the following table, the WVTR was measured at 90% relative humidity and 38° C. by a dry cup method according to ASTM D 1653. The tensile modulus was determined at a 4 inch per minute pulling rate according to TAPPI test method T-494.

1 of Table 1), the high mechanical shear and thermal history of the polymeric material resulted in some degradation of the polymer which affected the OTR and WVTR rates. Despite the degradation of the polymer, the extruder used to prepare the pellets was not strong enough to sufficiently disperse the clay in the resin. Agglomerates of clay can be seen in some of the extruded films such as in runs 7 and 8.

Run 9 made with calcine and surface treated clay exhibited a film having the best dispersion of clay therein as reflected by the OTR data. Despite the poor dispersion of clay in the EVOH, all of the film samples containing clay exhibited improved OTR as compared to the control sample (Run 1). The WVTR values were more sensitive to the film quality and thus Runs 2–6 exhibited higher values due to the relatively poor dispersion and/or compatibility of clay with the polymers. Run 9 had the best dispersion and thus exhibited the best film properties including a lower WVTR than the control sample (Run 1).

EXAMPLE 3

A pilot scale compounding trial was run using Leistritz 50 millimeter fully intermeshing, counter-rotating twin screw extruder. The clays used for this trial were SATINTONE 5, a calcined clay (Runs 2–6) and TRANSLINK 555, a surface treated clay (Runs 7–8) from Engelhard Corporation. The EVOH resin was SOARNOL K3825BN from Nippon Gohsei having an ethylene content of 38 mole %. The temperature set-points for each of the 8 zones of the extruder were as follows: zone 1—155° C., zone 2—177° C., zone 3—177° C., zone 4—177° C., zone 5—188° C., zone 6—188° C., zone 7—188° C., zone 8—202° C., zone 9—202° C. and zone 10—205° C. The screw speed was varied at a fixed feeding rate of 100 pounds per hour to determine the optimum processing conditions. Pellets made for each screw feed rate were fed into a Brabender model

TABLE 2

| Run No. | EVOH (wt. %) | Clay Type and wt. % | Dispersion Aid and (wt. %) | OTR (mil – cc per 100 in$^2$ – day) | WVTR[1] (mil – gram per 100 in$^2$ – day) | Tensile modulus (psi) |
|---|---|---|---|---|---|---|
| 1 | 100 | none | none | 1.65 | 2.8 | 206,000 |
| 2 | 80 | Clay 1, 20% | none | 1.01 | 5.1 | 160,000 |
| 3 | 75 | Clay 2, 25% | none | 1.34 | 4.6 | 144,000 |
| 4 | 75 | Clay 3, 25% | none | 0.78 | 4.0 | 177,000 |
| 5 | 60 | Clay 3, 40% | none | 1.04 | 3.1 | 277,000 |
| 6 | 56 | Clay 3, 40% | ACLYN 295A (4%) | 0.92 | 3.9 | 197,000 |
| 7 | 73 | Clay 3, 25% | AC-400A (2%) | no data | no data | no data |
| 8 | 71 | Clay 3, 25% | ACTONE 2573P (4%) | no data | no data | no data |
| 9 | 71 | Clay 4, 25% | ACYLN 295A (4%) | 0.39 | 2.4 | 268.000 |

In the foregoing runs, the polymeric material was passed through the twin screw extruder twice. As reflected the control sample (Run 1) compared to the control sample (Run 2503—¾ inch laboratory single screw extruder to produce thin films for evaluation. The processing conditions and properties of the films are contained in the following table.

TABLE 3

| Run No. | EVOH (wt. %) | Clay (wt. %) | Dispersion Aid and (wt. %) | Screw Speed (RPM) | OTR (mil – cc per 100 in² – day) | WVTR (mil – gram per 100 in² – day) | Tensile modulus (psi) |
|---|---|---|---|---|---|---|---|
| 1 | 100 | none | none | 100 | 0.76 | 3.5 | 260,000 |
| 2 | 70 | 30 | none | 100 | 0.28 | 3.5 | 430,000 |
| 3 | 70 | 30 | none | 150 | 0.43 | 2.8 | 450,000 |
| 4 | 70 | 29 | ACLYN 295A (1%) | 100 | 0.58 | 2.7 | 440,000 |
| 5 | 70 | 29 | ACLYN 295A (1%) | 150 | 0.21 | 2.8 | 440,000 |
| 6 | 60 | 38 | ACLYN 295A (2%) | 100 | 0.24 | 2.4 | 433,000 |
| 7 | 68 | 30 | ACLYN 295A (2%) | 125 | 0.15 | 2.0 | 433,000 |
| 8 | 68 | 30 | ACLYN 295A (2%) | 150 | 0.12 | 2.4 | 488.000 |

All of the clay/EVOH compositions of this example exhibited excellent dispersion in the films at clay loadings of 29 to 38 wt. %. OTR and WVTR for Runs 3–8 were significantly better than the control sample (Run 1) and the OTR for Run 2 was significantly better than that of the control. All of the film samples containing clay exhibited substantially higher tensile modulus and therefore would be expected to provide improved stiffness which leads to better bulge resistance in containers made with the compositions.

EXAMPLE 4

A pilot scale compounding trial was run using Welding Engineer's 50 millimeter non-intermeshing, counter-rotating twin screw extruder. The clays used for this trial were SATINTONE 5, a calcined clay (Runs 2–4) and BUCA, a non-calcined clay (Runs 5–6) from Engelhard Corporation. The EVOH resin was SOARNOL 3825 from Nippon Gohsei having an ethylene content of 38 mole %. The temperature of the extruder barrel was set at 180° C. The screw speed was varied at a fixed feeding rate of 100 pounds per hour to determine the optimum processing conditions. Pellets made for each screw feed rate were fed into a Brabender model 2503–¾ inch laboratory single screw extruder to produce thin films for evaluation. The processing conditions and properties of the films are contained in the following table.

As shown by Runs 2–6, all of the samples containing calcined or non-calcined clay exhibited substantially improved OTR's and tensile moduli, and Runs 2–4 and 6 exhibited substantially improved WVTR's over the control sample (Run 1) which did not contain clay. Run number 5 exhibited a worse WVTR than the samples of runs 1–4 and 6, probably due to poorer dispersion of the BUCA clay in the EVOH. At the higher screw speed of 200 rpm, the BUCA clay was well dispersed in the polymer as evidenced by the low OTR and WVTR. A comparison of Run 5 with Run 6 shows the sensitivity of the WVTR to the dispersion of clay in the polymers.

EXAMPLE 5

Nylon 6 polymer from Allied-Signal under the trade name CAPRON B73ZP was compounded with SATINTONE 5HB clay from Engelhard Corporation for the following runs. The compounder and other equipment used in this example were the same as described in Example 2. The temperature set points for each zone of the extruder were as follows: zone 1—220° C., zone 2—230°, zone 3—240°, zone 4(extruder die)—240° C. The results of these runs are given in the following table.

TABLE 4

| Run No. | EVOH (wt. %) | Clay (wt. %) | Dispersion Aid and (wt. %) | Screw Speed (RPM) | OTR (mil – cc per 100 in² – day) | WVTR (mil – gram per 100 in² – day) | Tensile modulus (psi) |
|---|---|---|---|---|---|---|---|
| 1 | 100 | none | none | 125 | 0.4 | 3.5 | 240,000 |
| 2 | 68 | 30 | ACLYN 295A (2%) | 125 | 0.19 | 2.7 | 342,000 |
| 3 | 68 | 30 | ACLYN 295A (2%) | 167 | 0.17 | 2.3 | 372,000 |
| 4 | 68 | 30 | ACLYN 295A (2%) | 200 | 0.11 | 2.8 | 365,000 |
| 5 | 68 | 30 | ACLYN 295A (2%) | 125 | 0.20 | 3.9 | 393,000 |
| 6 | 68 | 30 | ACLYN 295A (2%) | 200 | 0.15 | 2.8 | 355,000 |

TABLE 5

| Run No. | Nylon 6 (wt. %) | Clay (wt. %) | OTR[1] (mil-cc per 100 in$^2$-day) | WVTR[2] (mil-gram per 100 in$^2$-day) | Tensile modulus (psi) |
|---|---|---|---|---|---|
| 1 | 100 | none | 5.6 | 17.1 | 77,000 |
| 2 | 75 | 25 | 4.7 | 16.1 | 142,000 |

The foregoing example shows the improved transport properties which can be obtained by making a composition of clay and nylon. As shown by the foregoing runs, the clay filled nylon film sample of Run 2 had substantially lower OTR and WVTR and was substantially stiffer, as indicated by the tensile modulus, than a nylon film which did not contain clay (Run 1).

EXAMPLE 6

Pellets made according to Example 3, Run 4 were used for co-extrusion coating of paperboard substrates. A multilayer film was co-extruded onto one side of a paperboard substrate having a basis weight of 291 pounds per 3000 square feet. The opposite side of the paperboard was coated with a single layer of low density polyethylene in a separate extrusion coating process prior to co-extruding the multi-layer coating onto the substrate. The EVOH/clay pellets used in the multi-layer coating were dried in an oven at 110° C. overnight and had a moisture content of 0.05 wt. %.

Two coated samples were prepared. The control sample (Run 1) had the following multi-layer construction:

Run 1 —-LDPE-1/paperboard/LDPE-2/Tie-layer/EVOH/Tie-layer and Run 2 had the following multi-layer construction:

Run 2 —LDPE-1/paperboard/LLDPE/Tie-layer/clay-EVOH/Tie-layer wherein the LDPE-1 was TENITE 1924P, a low density polyethylene available from Eastman Chemical Company of Kingsport, Tenn., the LDPE-2 was CHEVRON 1017, a low density polyethylene from Chevron Chemical Company of San Ramon, Calif., the Tie-layer was TYMOR 1221E, an ethylene-maleic anhydride copolymer from Morton International, Inc. of Chicago, Ill., the EVOH was SOARNOL 3808 from Nippon Gohsei, the LLDPE was DOWLEX 3010, a linear low density polyethylene from Dow Chemical Company of Midland, Mich. In Run 2, the EVOH layer contained 30 wt. % clay.

The paperboard samples were tested for OTR and WVTR and the results are given in the following table.

TABLE 6

| Run No. | OTR (cc/100 in$^2$-day) | WVTR (grams/100 in$^2$-day) |
|---|---|---|
| 1 | 0.5 | 0.6 |
| 2 | 0.21 | 0.5 |

As seen by comparing the paperboard sample of Run 2 to the control sample of Run 1, paperboard coated with a clay/EVOH barrier layer had significantly a lower OTR than the control sample and an improved WVTR as compared to the control sample.

Having described various aspects and embodiments of the invention and several advantages thereof, it will be recognized by those of ordinary skill that the invention is susceptible to numerous modifications, substitutions and revisions within the spirit and scope of the appended claims.

What is claimed is:

1. A layered composite comprising a paper or paperboard substrate having opposed surfaces and a barrier layer extrusion laminated adjacent at least one of the surfaces of the substrate, the barrier layer comprising a composition containing from about 1 to about 80% by weight clay homogeneously dispersed in from about 20 to about 99% by weight of a continuous phase comprising a thermoplastic material selected from the group consisting of polyolefins and copolymers of ethylene and vinyl alcohol and, optionally, a coupling agent, compatibilizer or dispersion aid.

2. The composite of claim 1 wherein the clay is selected from the group consisting of calcined clay, non-calcined clay and silane-treated clay.

3. The composite of claim 1 wherein the clay is selected from the group consisting of montmorillonite, bentonite and kaolinite.

4. The composite of claim 1 wherein the clay has an average particle size ranging from about 0.04 to about 2 microns.

5. The composite of claim 1 wherein the thermoplastic material comprises ethylene vinyl alcohol copolymer.

6. A food container comprising the composite of claim 1.

7. The composite of claim 1 further comprising at least one polyolefin layer disposed on said substrate, at least one tie layer disposed on said polyolefin layer with said barrier layer disposed on said tie layer.

8. The composite of claim 7 wherein the thermoplastic material comprises ethylene vinyl alcohol copolymer.

9. The composite of claim 7 wherein the polyolefin layer has a thickness ranging from about 15 to about 30 microns and the tie layer has a thickness ranging from about 2 to about 5 microns.

10. The composite of claim 1 wherein the barrier layer has a thickness ranging from about 1 to about 30 microns.

11. The composite of claim 1 wherein the barrier layer has a thickness ranging from about 3 to about 8 microns.

12. A multi-layer composite having at least one paperboard layer having opposed first and second surfaces and a barrier thereon, the barrier layer being formed by dispersing from about 1 to about 80% by weight particulate clay in from about 20 to about 99% by weight thermoplastic polymer selected from the group consisting of polyolefins and copolymers of ethylene and vinyl alcohol and, optionally, a coupling agent, dispersion aid and/or compatibilizer under conditions sufficient to provide an essentially dry, continuous polymer phase with clay homogeneously dispersed therein without significantly degrading the polymer, and extrusion laminating the polymer phase containing clay as a layer disposed adjacent said first surface of the paperboard layer at a rate of from about 500 to about 2000 linear feet per minute to obtain a coating weight of from about 2 to about 60 pounds per 3000 square feet of substrate and thereby provide a clay/polymer barrier layer having a thickness ranging from about 1 to about 100 microns adjacent said first surface of said paperboard layer.

13. A food container containing the multi-layer composite of claim 12.

14. A multi-layer composite for use in making food containers comprising a paperboard substrate having opposite first and second surfaces and a barrier layer extrusion laminated adjacent said first surface comprising a composition containing from about 1 to about 80 percent by weight clay homogeneously dispersed in from about 20 to about 99 percent by weight of a continuous phase comprising a thermoplastic material selected from the group consisting of an ethylene/vinyl alcohol (EVOH) copolymer, and a polyolefin and, optionally, from about 0 to about 15 percent by weight coupling agent, compatibilizer and/or dispersion aid, wherein the barrier layer has a first and a second surface and a thickness of from about 1 to about 30 microns, the barrier layer being disposed with its first surface adjacent the first surface of the substrate.

15. The composite of claim 14 wherein the clay is selected from the group consisting of calcined clay, non-calcined clay and silane-treated clay.

16. The composite of claim 14 wherein the clay is selected from the group consisting of montmorillonite, bentonite and kaolinite.

17. The composite of claim 14 wherein the clay has an average particle size ranging from about 0.04 to about 2 microns.

18. The composite of claim 14 further comprising an adhesive layer or tie layer having a first and a second surface with its first surface dispersed adjacent the first and/or second surface of said barrier layer wherein said adhesive layer or tie layer has a thickness ranging from about 2 to about 5 microns.

19. The composite of claim 18 further comprising a polymeric layer selected from a polyolefin layer, a polyester layer and a polyamide layer disposed adjacent the second surface of said adhesive layer or tie layer and/or the second surface of the substrate, said polymeric layer having a thickness ranging from about 15 to about 30 microns.

20. A food container having a wall defined by a multi-layer composite comprising a paperboard layer having opposite first and second surfaces and a barrier layer having a first and a second surface with its first surface extrusion laminated adjacent said first surface of said paperboard layer and comprising a composition containing from about 1 to about 80 percent by weight clay homogeneously dispersed in a continuous phase comprising from about 20 to about 99 percent by weight of a polymeric material selected from the group consisting of an ethylene/vinyl alcohol (EVOH) copolymer, and a polyolefin and, optionally, from about 0 to about 15 percent by weight coupling agent, compatibilizer and/or dispersion aid wherein the barrier layer has thickness of from about 1 to about 30 microns.

21. The container of claim 20 wherein the clay is selected from the group consisting of calcined clay, non-calcined clay and silane-treated clay.

22. The container of claim 20 wherein the clay is selected from the group consisting of montmorillonite, bentonite and kaolinite.

23. The container of claim 20 wherein the clay has an average particle size ranging from about 0.04 to about 2 microns.

24. The container of claim 20 further comprising an adhesive layer or tie layer having a first and a second surface with its first surface disposed adjacent the first and/or second surface of said barrier layer wherein said adhesive layer or tie layer has a thickness ranging from about 2 to about 5 microns.

25. The container of claim 24 further comprising a polymeric layer selected from a polyolefin layer, a polyester layer and a polyamide layer disposed adjacent the second surface of said adhesive layer or tie layer and/or the second surface of the substrate, said polymeric layer having a thickness ranging from about 15 to about 30 microns.

26. A food container having a wall defined by a multi-layer composite comprising a substrate layer selected from paper, paperboard, polymer film, aluminum foil and combinations of two or more of the foregoing materials having opposite first and second surfaces and a barrier layer having a first and a second surface with its first surface extrusion laminated adjacent said first surface of said paperboard layer and comprising a composition containing from about 1 to about 80 percent by weight clay homogeneously dispersed in from about 20 to about 99 percent by weight of a continuous phase comprising a polymeric material selected from the group consisting of an ethylene/vinyl alcohol (EVOH) copolymer, and a polyolefin and, optionally, from about 0 to about 15 percent by weight coupling agent, compatibilizer and/or dispersion aid wherein the barrier layer has thickness of from about 1 to about 30 microns.

27. The container of claim 26 wherein the clay is selected from the group consisting of calcined clay, non-calcined clay and silane-treated clay.

28. The container of claim 26 wherein the clay is selected from the group consisting of montmorillonite, bentonite and kaolinite.

29. The container of claim 26 wherein the clay has an average particle size ranging from about 0.04 to about 2 microns.

30. The container of claim 26 further comprising an adhesive layer or tie layer having a first and a second surface with its first surface disposed adjacent the first and/or second surface of said barrier layer wherein said adhesive layer or tie layer has a thickness ranging from about 2 to about 5 microns.

31. The container of claim 26 further comprising a polymeric layer selected from a polyolefin layer, a polyester layer and a polyamide layer disposed adjacent the second surface of said adhesive layer or tie layer and/or the second surface of the substrate, said polymeric layer having a thickness ranging from about 15 to about 30 microns.

32. A composition comprising from about 1 to about 80% by weight clay homogeneously dispersed in from about 20 to about 99% by weight of a continuous phase comprising an ethylene vinyl alcohol copolymer and optionally, a coupling agent, compatibilizer or dispersion aid.

33. The composition of claim 32 wherein the clay is selected from the group consisting of calcined clay, non-calcined clay and silane-treated clay.

34. The composition of claim 32 wherein the clay is selected from the group consisting of montmorillonite, bentonite and kaolinite.

35. The composite of claim 32 wherein the clay has an average particle size ranging from about 0.04 to about 2 microns.

36. A food container comprising the composition of claim 32.

* * * * *